Jan. 15, 1963  H. W. WILLIAMS  3,073,472
CLOSURE FOR CONTAINERS
Filed Jan. 30, 1961

INVENTOR
Harold W. Williams
BY
R. S. Kelley.
ATTORNEY

United States Patent Office 3,073,472
Patented Jan. 15, 1963

3,073,472
CLOSURE FOR CONTAINERS
Harold W. Williams, % Lumelite Corporation,
Pawling, N.Y.
Filed Jan. 30, 1961, Ser. No. 85,573
1 Claim. (Cl. 215—46)

My invention relates to improvements in closures for containers intended especially for small glass bottles such as used in the pharmaceutical industry.

Various forms of bottle stoppers and caps are now being made of polyethylene and the many advantages of this material are well known, particularly in the drug industry. While other thermo-plastic material may be found suitable; polyethylene has the necessary degree of strength and firmness. At the same time, in the molded state it is pliable, and when stretched or otherwise deformed, it tends to return to its original shape so that it can be made to engage the walls of a container, either externally or internally, in fluid tight contact. It is from such plastic material that my improved closure is made, and it will usually be referred to hereinafter simply as "pliable plastic material."

More particularly, the invention deals with a closure which can be molded in one piece of pliable plastic material, which, after initial assembly on the bottle, is tamper-proof so as to require tearing away of a portion of the original closure piece, and wherein the remaining portion may be used for repeated closings as many times as desired.

Among the objects of the invention are to provide a closure of the above type which will protect the lip and adjacent exterior surfaces of the neck of the bottle against contamination after it has first been opened and a portion of its contents dispensed; to provide a closure of the above type wherein no part of the same remains on the bottle when it is opened; and to provide a closure construction wherein a single rib and groove interlock between the outer wall of the closure and the neck of the bottle will suffice to prevent undetected access to the bottle contents, or in other words, tamper-proofness.

The foregoing and other objects and advantages of the invention that will hereinafter appear, are realized in the particular embodiment of the invention illustrated in the accompanying drawings and described in detail below.

Figure 1:
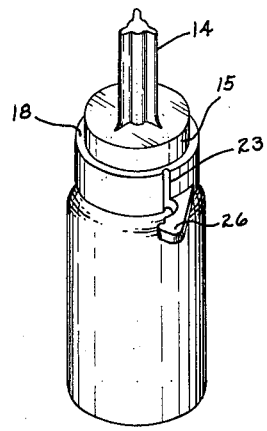
FIG. 1 is a perspective view showing my improved closure as initially connected to a small bottle.
Figure 2:
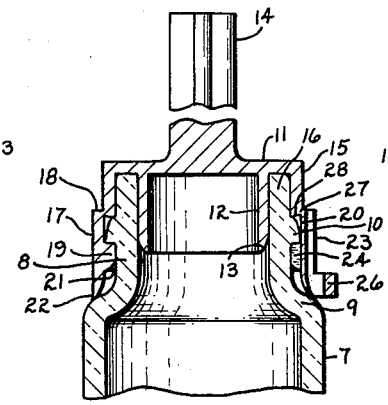
FIG. 2 is a central vertical crosssection through the closure and a portion of the bottle.

I have shown my improved closure in association with a glass bottle 7, having a neck 8 joined to the bottle by a rounded or sloping shoulder 9. Extending around the intermediate portion of the neck is a circular bead 10, the outer surface of which is beveled or angled inwardly (toward the top) while the bottom outer corner is sharply angled and preferably square.

The invention is shown as embodied in a closure, which may be generally described as being of the combination cap and stopper type. It has a top wall 11 extending over the mouth of the bottle, a hollow cylindrical portion 12 depending from the central region of the top wall and adapted to have tight engagement with the inner surface of the bottle neck as a stopper, and a concentric outer wall spaced radially from the stopper element and adapted to have tight engagement with the outer surface of the neck 8. The stopper element is open at the bottom to facilitate molding and it bottom edge is beveled as indicated at 13 to lead it into the mouth of the bottle. For easy manipulation, the closure is provided with a stem or handle 14 which may extend from the central portion of the top wall 11.

Figure 3:
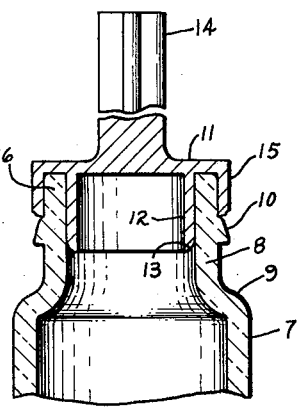
FIG. 3 is a view similar to FIG. 2 showing the locking ring torn away.

The closure outer wall, which depends from the outer edge of the top wall 11, has an upper section 15 adapted at all times to fit snugly around the upper section 16 of the bottle neck, and a larger diameter lower section 17 resulting in a shoulder 18 between the two sections. This entire lower section 17 constitutes what may be called a tear away ring which is removed and discarded when the bottle is first used, as seen in FIG. 3. It will thus be seen that no scrap or "dead" portion of the closure remains on the bottle while the contents of the bottle are being poured or otherwise removed.

Figure 4:
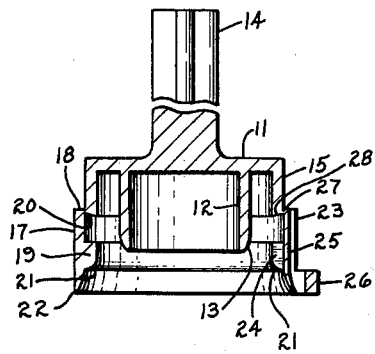
FIG. 4 is a vertical sectional view through the closure before assembly with the bottle.
Figure 5:
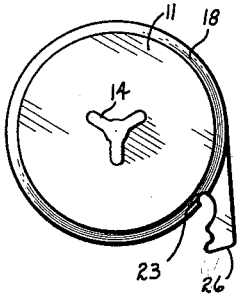
FIGS. 5 and 6 are bottom and top plan views respectively of the complete closure.
Figure 6:
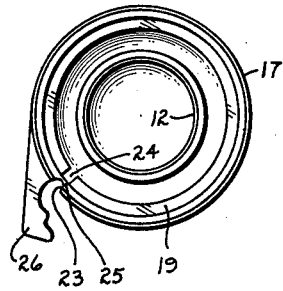

In addition to this advantage just mentioned, the lower section 17 constitutes a locking ring so made that effective tamper-proofness is accomplished in a one piece closure of pliable plastic material such as polyethylene, and at the same time retaining the advantages of economical assembly of the closure to the bottle by simple endwise pressure applied to the top wall of the closure, and without requiring more than a single bead on the neck of the bottle. To this end, the lower section 17 has an internal circular rib 19, with a sharply angled or square upper corner to interlock under the bottom square corner of the bead 10 on the bottle, which bead is received in the internal circular groove 20 between the shoulder 18 and the rib 19. This rib may have a rounded or beveled bottom corner 21 to cooperate with the sloping outer surface of the bead 10, to lead the cap over this bead during initial assembly of the cap to the bottle. The outer wall of the closure terminates in a bottom skirt 22 which tapers to a comparatively thin edge which fits neatly against the sloping shoulder 9 on the bottle. As best seen in FIGS. 4 and 6, there is a groove 23 extending entirely across the larger diameter section or tear ring 17, and opposite the groove 23 on the inside is a groove 24 running through the rib 19, which results in the thin frangible or tearable section 25, which preferably extends vertically across the locking ring 17. This section thins out to almost nothing at the bottom edge of the tapering skirt 22 so as to facilitate initiation of the tearing action. While this section is made strong enough to permit the closure to snap into position during assembly, it nevertheless may be readily torn after the tear is once started. This is conveniently done by twisting and pulling on the tab 26 preferably extending at some such angle as indicated in FIGS. 5 and 6. The weakened section or tear line 25 connects with a second weakened horizontally extending section or tear line 27 running entirely around the closure at the inner edge of the shoulder or, in other words, at the bottom of section 15. For this purpose, the closure may be molded with an angular undercut 28 on the inner surface opposite the location just described for the circular tear line 27.

The reason that the above described closure is effectively tamper-proof will now be readily understood. In any attempt to remove the closure in one piece without noticeable damage, the bottom wall must be angled outwardly enough to move the square shouldered rib 19 over the square shouldered bead on the glass. In the construction shown and described this cannot be done, even in the case of the single rib and groove interlock, and even though the material is somewhat pliable, as is linear polyethylene, because there will be a tear or rupture at the tear line 25. It will be observed that during initial assembly no such angling or degree of stretching of the bottom edge portion is required as would be the case in an attempt to pry off the closure after it is once on the bottle.

After the tear-away ring is discarded and the desired portion of the contents removed, the bottle may be tightly reclosed with the stopper 12 fitting inside the neck and the cap 15 fitting over it. Not only is there no portion of the original closure remaining on the bottle for possible contamination during pouring, but a nicely fitting cap is still connected to the stopper to protect the outer surface around the bottle mouth.

What I claim as new and desire to secure by Letters Patent is:

A container and closure combination comprising a bottle having a single circular bead around its neck spaced a substantial distance from the mouth of the bottle, the diameter of the upper portion of the bottle neck being substantially the same as the diameter of the lower portion of the neck below said bead, the outer bottom corner of said bead being square and its lateral surface tapering inwardly toward the mouth of the bottle, a closure consisting of a single piece of pliable plastic material having a top wall overlying the mouth of the bottle and an outer wall embracing the bottle neck, said outer wall consisting of an upper cylindrical section fitting around that portion of the bottle neck above said circular bead and a larger diameter lower section having an internally projecting circular rib with a square upper corner to interlock under the square bottom corner of said bead, with the bead fitting in a groove between said rib and said upper section, there being a weakened section providing a circular tear line extending entirely around said closure adjacent the juncture of said large and small diameter sections and a second weakened section providing a tear line extending from said circular tear line downwardly across said rib to the bottom edge of said lower section, whereby said lower section including said rib may be torn away and discarded, and a pull tab connected to said rib adjacent said crosswise extending tear line.

References Cited in the file of this patent

FOREIGN PATENTS

| | | |
|---|---|---|
| 1,201,114 | France | July 6, 1959 |
| 1,213,931 | France | Nov. 2, 1959 |
| 1,223,035 | France | Jan. 25, 1960 |
| 1,247,480 | France | Oct. 24, 1960 |